United States Patent [19]

Balmer

[11] Patent Number: 5,039,129
[45] Date of Patent: Aug. 13, 1991

[54] VEHICLE FOR AGRICULTURAL USE

[76] Inventor: Charles Balmer, Box 34, Elie, Manitoba, Canada R0H 0H0

[21] Appl. No.: 436,649

[22] Filed: Nov. 15, 1989

[51] Int. Cl.$^5$ ............................................. B62D 61/00
[52] U.S. Cl. .................................. 280/840; 280/400; 180/906; 180/209; 180/900
[58] Field of Search ............... 180/209, 233, 235, 139, 180/55, 906, 139, 134; 280/133, 701, 690, 840, 400, 638, 426, 468, 43, 111, 117; 37/117.5

[56] References Cited

U.S. PATENT DOCUMENTS

| | | | |
|---|---|---|---|
| 2,452,358 | 10/1948 | Delong et al. | 280/133 |
| 2,513,942 | 7/1950 | Johnson et al. | 180/209 |
| 3,100,653 | 8/1963 | Ibaugh et al. | 280/638 |
| 3,154,164 | 10/1964 | Shaw et al. | 180/209 |
| 3,878,911 | 4/1975 | Nichols | 180/235 |
| 4,081,050 | 3/1978 | Hennessey et al. | 180/233 |
| 4,350,222 | 9/1962 | Lutteke et al. | 180/209 |
| 4,530,514 | 7/1985 | Ito | 280/701 |
| 4,740,011 | 4/1988 | Mitobe et al. | 280/690 |
| 4,809,805 | 3/1989 | Short | 180/139 |

FOREIGN PATENT DOCUMENTS

| | | |
|---|---|---|
| 0136910 | 4/1985 | European Pat. Off. |
| 2049/50 | 5/1988 | Fed. Rep. of Germany |
| 982360 | 6/1951 | France |
| 2216787 | 8/1974 | France |

OTHER PUBLICATIONS

Brochure of Berthound Entitled "Automoteur ABM 30-140" (Jan. 1986).
Brochure of Evrard Entitled "Pulverisateurs Automoteurs".
Brochure of Evrard Entitled "GP 9 Self Propelled LGP and High Clear Versions".
Brochure of Sequip Entitled "Automoteur 2800".
Brochure of Preciculture Entitled "UT 140 Automoteur".
Brochure of Melroe Co. Entitled "Spra-Coupe".
Brochure of Waltanna Entitled "Waltanna 4-325".
Brochure of Preciculture Entitled "UT 120 Automoteur".
Brochure of Hagie Mfg. Entitled "Model 8380/8370".

Primary Examiner—Richard A. Bertsch
Attorney, Agent, or Firm—Adrian D. Battison; Stanley G. Ade; Murray E. Thrift

[57] ABSTRACT

A field sprayer is self propelled and includes a frame with an engine mounted on the frame, four wheels hydraulically driven, a tank and a boom supported by the frame and extending outwardly to the sides. The frame includes a longitudinally beam, a front transverse channel and a rear transverse channel. Each of the channels supports a pair of axle members separately pivotal about axis adjacent the center line of the frame. Each axle member includes a horizontal portion which can be extended on-the-go and a vertical portion which is attached to the wheel. A gas spring is connected between the channel and the upper surface of the axle member. Articulated steering is provided by a vertical pin connecting the front portion of the frame relative to the rear portion of the frame with the pin being arranged just rearward of the front axle. The boom is adjustable in height to accommodate both fully grown crops and ground spraying conditions. The boom includes a pair of support beams and a spray shield defined by two separate pieces projecting outwardly from the respective support beams.

31 Claims, 8 Drawing Sheets

VEHICLE FOR AGRICULTURAL USE

RELATED APPLICATIONS

Attention is directed to related application Ser. No. 436,595 filed Nov. 15, 1989, and Ser. No. 437,087 filed Nov. 16, 1989, which are closely related to the present application and include disclosure of the same features shown herein but claim different aspects of the machine concerned.

BACKGROUND OF THE INVENTION

This invention relates to a vehicle which is particularly but not exclusively designed for use as an agricultural vehicle for transporting various loads across rough terrain in an agricultural process for example spraying liquid onto the ground or spreading of granular materials onto the ground.

Various designs of vehicle have previously been provided for example for use as field sprayers including three wheeled vehicles manufactured by Spray Coupe which comprise a self-propelled vehicle carrying the liquid to be sprayed together with a boom which defines the plurality of nozzles through which the liquid is sprayed. Vehicles of this type have a design of the frame and support system which has a number of disadvantages and cannot provide the suspension system nor the adjustability required for modern agricultural techniques and to accommodate high ground speeds required for modern vehicles of this type.

Other vehicles of this general type include large wheels with wide tires which provide suspension basically through the flexibility of the tire itself. While these vehicles can accommodate heavy loads and provide a satisfactory suspension, they of course cause significant damage to the ground or to the crop in view of the wide compressing action of the large tires.

Many designs of a vehicle of this type have a raised frame for high clearance and wheels mounted on vertical pivot coupling at the far corner of the frame. These designs do not lend themselves to an effective suspension system or to a steering system which will allow adjustment to the wheel spacing for row crop applications.

SUMMARY OF THE INVENTION

It is one object of the present invention therefore to provide a vehicle having a frame and wheel support system which enables the vehicle to carry out agricultural processes while cooperating more effectively with the crops and terrain.

It is a further object of the present invention to provide an improved suspension system for a vehicle of this type.

It is a further object of the present invention to provide a vehicle having an improved steering system.

It is a yet further object of the present invention to provide a vehicle which mounts the engine, frame and suspension system in a manner which allows ready access to the operating parts for service and repair.

According to the first aspect of the invention there is provided a vehicle comprising a frame, a pair of ground wheels each having a tire with a ground engaging periphery for supporting the frame in movement across the ground in a direction along an axis longitudinal of the frame, and a pair of suspension devices each for connecting a respective one of the ground wheels for flexible movement relative to the frame to accommodate variations in ground height, each suspension device comprising a rigid axle member, means mounting the axle member on the frame for pivotal movement about a suspension axis fixed relative to the frame and extending substantially parallel to said longitudinal axis, means mounting the ground wheel on the axle member for rotation about a wheel axis at right angles to the longitudinal axis and fixed relative to said axle member such that vertical movement of said ground wheel about said suspension axis causes horizontal movement of said tire periphery at the ground in a direction at right angles to said suspension axis, and spring means connected between said frame and said axle member providing a spring resistance to upward movement of said axle member relative to the frame about said suspension axis.

According to the second aspect of the invention there is provided a vehicle comprising a frame having a front frame portion and a rear frame portion, a front pair of ground wheels mounted on the front frame portion and a rear pair of ground wheels mounted on the rear frame portion, suspension means mounting the ground wheels on the frame for supporting the frame in movement across the ground in a direction along an axis longitudinal of the frame, an engine mounted on the frame providing motive power for driving at least one pair of the ground wheels, a load receiving section provided on the frame, and steering means comprising pivot connection means between the front frame portion and the rear frame portion and defining a vertical pivot axis, the pivot axis being arranged closer to the front pair of wheels than the rear pair of wheels.

According to the third aspect of the invention there is provided a vehicle comprising a frame, a front pair of ground wheels mounted on the frame, a rear pair of ground wheels mounted on the frame, suspension means mounting the ground wheels on the frame for supporting the frame in movement across the ground in a direction along an axis longitudinal of the frame, each of at least one pair of the ground wheels having a hydraulic motor mounted thereon for providing direct drive to the respective wheel, an engine having a main drive coupling at one end of the engine, a hydraulic pump driven by the main drive coupling of the engine for providing pressurized hydraulic fluid to the hydraulic motors, and means mounting the engine at one end of the frame with the main drive coupling and the hydraulic pump on that end of the engine which is adjacent said one end of the frame.

According to a fourth aspect of the invention there is provided a vehicle comprising a frame having a front frame portion and a rear frame portion, a front pair of ground wheels mounted on the front frame portion and a rear pair of ground wheels mounted on the rear frame portion, suspension means mounting the ground wheels on the frame for supporting the frame in movement across the ground in a direction along an axis longitudinal of the frame, an engine mounted on the frame providing motive power for driving at least one pair of the ground wheels, a load receiving section provided on the rear portion of the frame, and steering means comprising pivot connection means between the front frame portion and the rear frame portion and defining a vertical pivot axis, wherein the frame includes a single beam extending along a central axis of the frame and wherein pivotal movement of the front portion of the frame relative to the rear portion of the frame takes place solely about said vertical steering axis.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
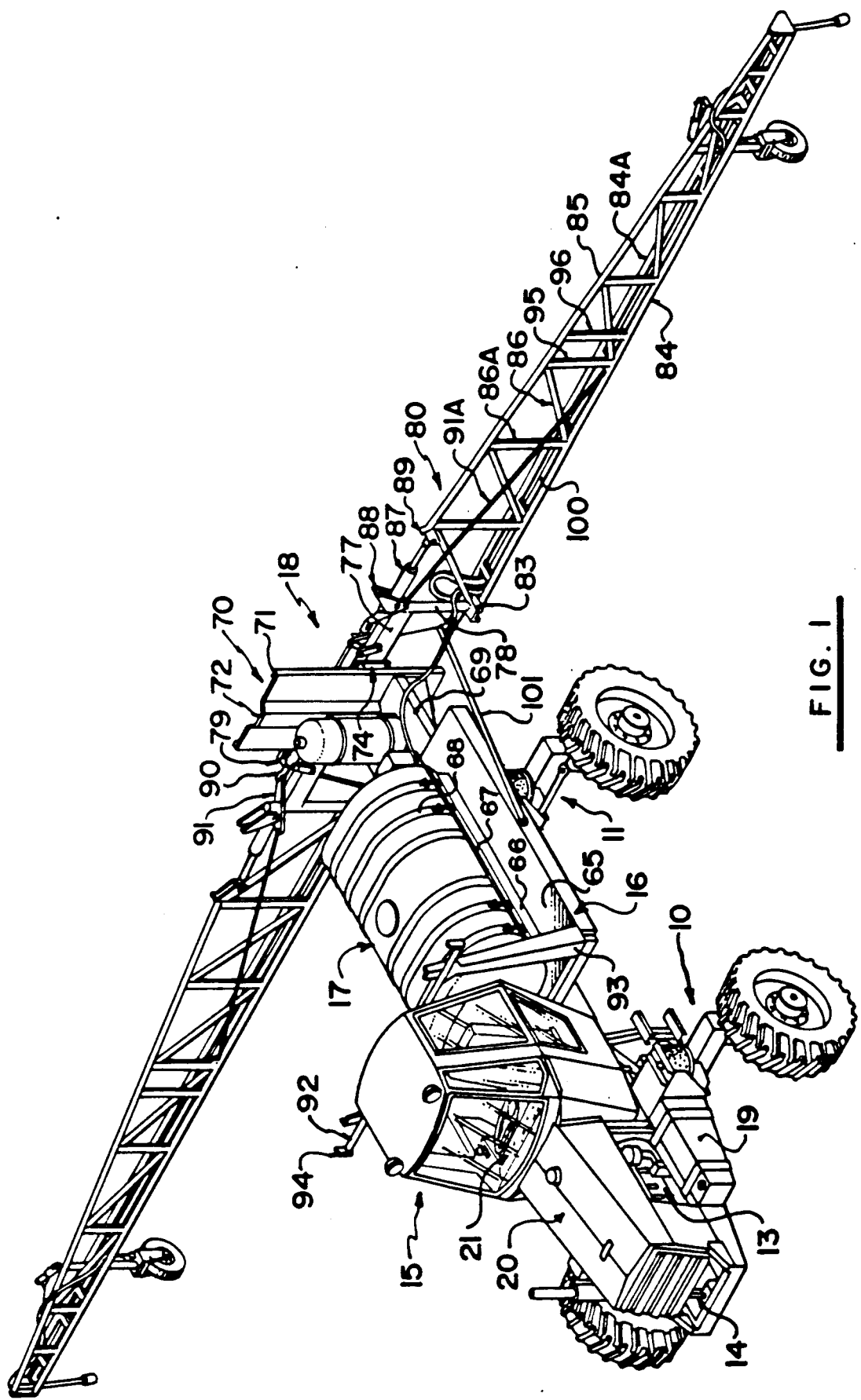
FIG. 1 is an isometric view of a field sprayer according to the invention.

The drawings illustrate and the following description relates to a sprayer for spraying agricultural crops which is particularly adapted for modern spraying conditions and is sufficiently adaptable to accommodate many different crop conditions and requirements.

However many of the aspects of the sprayer are applicable to other types of vehicle which are designed for agricultural use for example spreaders of particulate material which also include a boom assembly. While the description herein is therefore particularly directed to the sprayer, it is not intended that the protection provided by this patent should be so limited and other types of vehicle are contemplated by the inventor in this matter.

The sprayer shown particularly in FIGS. 1, 2 and 3 comprises a central frame supporting the vehicle including an elongate beam and a pair of axle assemblies generally indicated at 10 and 11 which will be described in more detail hereinafter. Upon the frame and axle assembly is mounted an engine 13, a hydraulic pump system 14, a cab 15, a platform 16 supporting a load in this case a tank 17 for liquid to be sprayed and a boom generally indicated at 18.

Further details of the vehicle are visible in FIG. 1 many of which are not of major importance to the present invention for example a return hydraulic fluid reservoir 19, an engine cover 20 and the various instrumentation in the cab indicated at 21.

Figure 4:
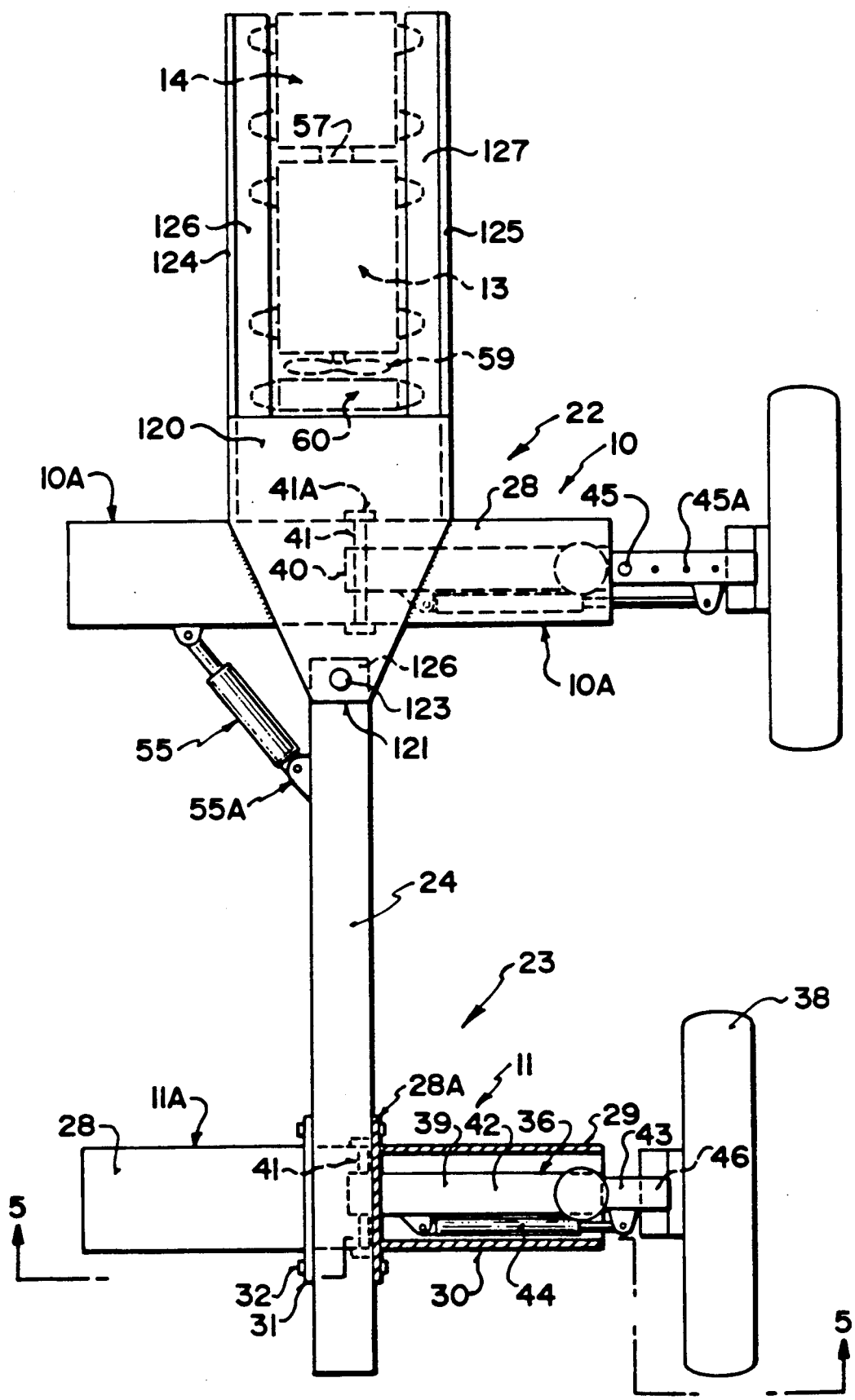
FIG. 4 is a top plan view of the frame, suspension and wheel arrangement of the sprayer of FIG. 1 with the cab tank and other parts removed.
Figure 5:
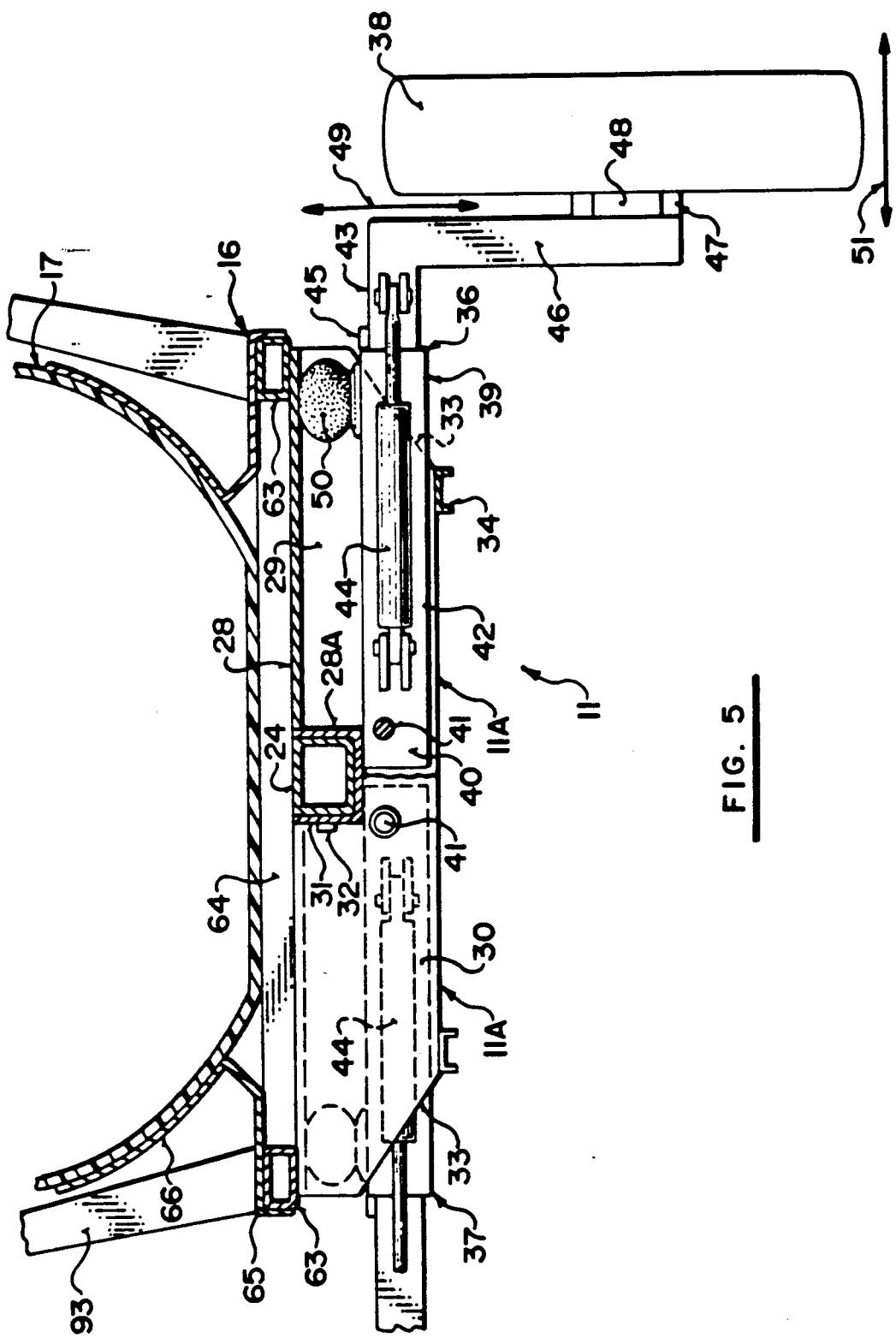
FIG. 5 is a cross-sectional view along the lines 5—5 of FIG. 4.
Figure 6:
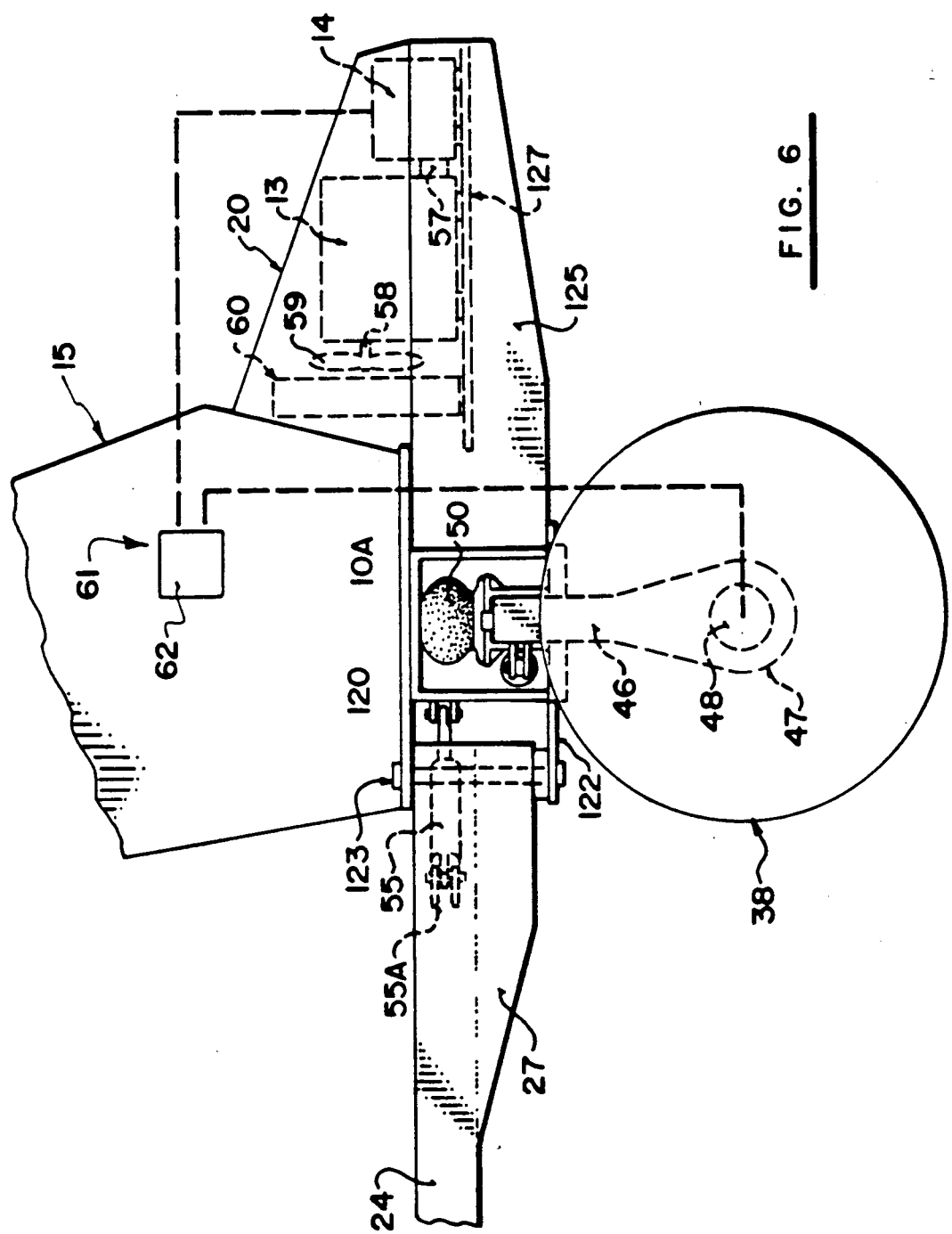
FIG. 6 is a side elevational view of a forward end of the sprayer with much of the super structure of the sprayer shown only schematically.

Turning therefore firstly to the frame and axle assembly shown best in FIGS. 4, 5 and 6, the main frame includes a front frame portion 22 and a rear frame portion 23. The rear frame portion comprises a central single elongate beam 24 in the form of square tube. The beam extends from the rear end 25 to a forward end 26 and is rigid and resistant to twisting. A support and stiffening element 27 is connected underneath the back end 26.

The rear axle assembly 11 comprises an inverted channel 11A with an upper web 28 and depending sides 29 and 30. A hole is cut through the sides 29 and 30 at the web 28 at a centre section of the channel to a depth of approximately half the depth of the sides 29 and 30 and a cross channel 28A is welded in place in the opening thus formed. The interior dimension of the cross channel is formed to accommodate the beam 24 which extends through the channel 28A thus formed in the channel 11A and is clamped to the cross channel 28A at portions 31 thereof which project outwardly from the sides 29 and 30 along the sides of the beam 24. The portions 31 are clamped to the beam by suitable bolt connections 32 which project through holes in the beam which are located at spaced positions along the length of the beam to accommodate different positions of the rear axle assembly 11 along the beam. Depending upon the load applied to the frame, therefore, the position of the rear axle assembly can be chosen so that the balance of the weight applied to the different wheels is optimized.

The sides 29 and 30 are substantially continuous along the length of the channel except that outermost lower corners 33 are chamfered. A channel iron 34 is welded across the open face of the channel to provide structural rigidity for the sides. Upstanding reinforcing webs can be welded on the upper surface of the web to provide structural strength transverse to the web adjacent its outermost ends.

The channels 11A and 10A are therefore rigidly coupled to the beam and form therewith a rigid frame structure longitudinal of the vehicle and transverse to the vehicle. The front axle assembly 10 is substantially equivalent to the rear axle assembly with the differences being described in detail hereinafter. The basic structure remains common however and therefore the same reference numerals are used in relation to the front axle assembly as shown in FIG. 4.

Two axle members 36 and 37 each supporting a respective ground wheel 38 are mounted on the channel for pivotal suspension movement relative thereto. Each axle member comprises a horizontal portion 39 which extends from an innermost end 40 pivotally connected to the channel by a pin 41 extending through the horizontal portion 39 and through the sides 29 and 30 of the channel. The pin 41 thus defines a pivot axis which is substantially immediately adjacent the centre axis of the vehicle defined at and the beam 24 positioned beneath the beam 24. The axis of the pivot pin 41 is parallel to the direction of movement to the vehicle and in a substantially horizontal plane so that the horizontal portion 39 of the axle member is confined to pivot about the pin 41 with the outer end thereof moving in a vertical plane. As shown in FIG. 5, the horizontal portion 39 extends outwardly at right angles to the centre axis of the vehicle and the horizontal portion is confined to move up and down in this vertical plane at right angles to the vehicle axis. As the pin 41 must resist twisting of the axle member 36 about a vertical axis and about an axis longitudinal to the axle member, the pin is coupled to the sides 29 and 30 by a pair of large bearings 41A bolted on the outer surfaces of the sides.

The horizontal portion 39 of the axle member is defined by an outer sleeve member 42 and an inner tubular member 43 which can slide in the sleeve member as best shown in FIG. 4 to increase and decrease the effective length of the horizontal portion. Adjustment of the length of the horizontal portion is obtained by a hydraulic cylinder 44 which is connected at one end to an outer surface of the sleeve member 42 and at the opposed end to an outer surface of the tubular portion 43. The length can be adjusted by initially driving the cylinder 44 outwardly to increase the amount of the tubular portion 43 extending out of the channel 42 and then reversing the action of the cylinder to draw the tubular portion 43 back into the channel up to engagement of a pin 45 with the end surface of the channel 42. The pin 45 can be located in a number of different holes 45A as shown. Thus in FIG. 4 the front axle assembly is shown in an extended position whereas the rear axle assembly is shown in a retracted position and it will be appreciated that each of the axle members can be extended individually to a required length depending upon circumstances. For example it is possible to extend the axle members on one side of the vehicle to a greater extent than that of the other side of the vehicle when running on a side of the hill.

The outer end of the tubular portion 43 is welded to a vertical tubular portion 46 which extends downwardly from the outer end to a hub 47 of the ground wheel 38. The extent of the vertical portion 46 is sufficient that the upper edge of the wheel is approximately at the same height as the underside of the horizontal portion thus raising the clearance of the frame of the vehicle to a height well above ground level to accommodate passing over crops which are already well grown. In practice the height of the clearance would be of the order of 48 to 96 inches depending upon the crops with which the sprayer is intended to be used. The wheel size and length of the member 46 can be altered accordingly.

Drive to the wheels 38 is provided by a hydraulic motor of conventional type mounted within the hub 47 schematically indicated at 48. Drive can be provided to all four wheels if required or to only two of the wheels depending upon known design parameters.

In a suspension action of the axle member relative to the fixed channel forming part of the frame, the axle member moves upwardly and downwardly as indicated by the arrow 49. Spring resistance to upward movement of the axle member is provided by a single gas spring 50 mounted on top of the horizontal portion at the outer end of the channel 42 and between the upper surface of the channel 42 and the under surface of the web 28 of the channel of the frame. Reinforcing flanges of the web 28 can be positioned at the gas spring 50 to accommodate the loads applied on the web 28 by the gas spring.

The gas spring is of a conventional type readily available from Goodyear or Firestone selected according to the loads to be accommodated. A gas spring of 6 inch travel will give a suspension movement at the wheel of the order of 12 inches.

The single gas spring has of course no shock damping properties and acts simply as a spring resistance to upward movement of the axle member. The single gas spring has the advantage relative to a conventional flexible metal spring that it has a substantially constant spring resistance over a relatively wide range rather than having an increasing spring resistance as is obtained by a conventional metallic spring arrangement. The design of the gas spring is not shown in detail as this is a commercially available item as described above.

The pivot axis for the axle member is arranged as close as possible to the centre axis of the vehicle. It will be appreciated from the geometry of FIG. 5 that vertical movement of the axle member along the line 49 will result in transverse movement of the wheel and particularly the lower most edge of the wheel in contact with the ground as indicated by the arrows 51. The positioning of the pivot axis of the axle member as close as possible to the centre of the vehicle minimizes this amount of movement. The height of the vertical portion increases the amount of movement so that in a practical arrangement in which the length of the horizontal portion is substantially equal to the height of the pivot axis from the bottom of the wheel, the amount of movement along the line 51 is equal to the movement 49. However the movement of the wheel and the flexing of the tire is used positively in this suspension design to provide the sole shock damping arrangement thus avoiding necessity for any other shock absorbing devices. The tire uses a conventional agricultural vehicle tire and the flexing of the tire and the movement of the tire relative to the ground can readily accommodate the movement necessary along the line 51.

This suspension arrangement has a number of significant advantages for agricultural vehicles.

1. It surprisingly provides a significant improvement in stability so that the vehicle can move over rough terrain at relatively high speeds of up to 15 miles an hour with the suspension system accommodating and accepting vigorous movements for example as provided by passage across a ditch.

2. The amount of roll of the vehicle from side to side is very limited which is of particular importance bearing in mind the high centre gravity of the load.

3. There is no torque effect on acceleration or deceleration of the vehicle. The torque effect occurs on acceleration on most suspension systems in that the suspension rises or lowers significantly as the vehicle accelerates from rest. This is due to a torquing of the suspension spring system which causes it to vary in length and thus lift or lower the vehicle and its load. In the case of a sprayer this is highly undesirable since if it occurs, the boom will drop vigorously toward the ground during startup or acceleration which will significantly alter the spray pattern.

4. The system will accommodate adjustment of the length of the axle member to vary the vehicle track Width for on-the-go adjustment. Variation of the track width is necessary to accommodate the various row widths of row crops and to accommodate the tram-line farming system in which repeated passes over the ground are carried out on the same wheel tracks to avoid damaging crops and to avoid the necessity to plant seeds on the intended wheel tracks.

Turning now to particularly FIGS. 6 and 4, the steering system for the vehicle is shown which is provided by an articulated steering system so that the front and rear axle assemblies 10 and 11 can be substantially identical. The front axle assembly 10 including the channel member 10A has mounted on the upper surface that is the upper surface of the web 28 a plate 120 which includes a front portion extending forwardly from the front surface of the channel 10A which is substantially equal to the width of the engine compartment. From a line across the front surface of the channel 10A, the plate 120 tapers rearwardly from both sides toward an apex rearwardly of the rear surface of the channel 10A. The apex terminates in a transverse edge 121 of the plate which is substantially equal in width to that of the beam 24. A second plate 122 is attached across the underside of the channel 10A and projects only rearwardly from the channel 10A and is shaped similarly to the rear part of the upper plate 120. The plates therefore define between them a space for receiving the front end of the beam 24 and the stiffening element 27. Both the beam 24 and the stiffening element 27 include a vertical opening for receiving a pin 123 passing through the plates and through the beam to define a single vertical axis at which the beam can pivot relative to the plates. Suitable bearings for the pin 123 are provided so that the steering action can take place without wear but the details of these are not shown. The pivot pin 123, therefore, provides a pivot axis which is of the order of 18 inches rearwardly of a line joining the rotation axis of the front pair of wheels. Thus the pivot axis is significantly closer to the front axle than to the rear axle and provides an articulated steering system so that the front axle and the front frame portion pivot about the steering axis relative to the rear axle and the rear frame portion. The positioning of the steering axis adjacent the front axle causes the vehicle to move in a steering action so that the front portion of the frame pivots about the pivot axis rather than the conventional articulated steering system in which both the front and rear portions tend to pivot equally about the pivot axis. This steering action of the front portion of the frame causes the vehicle to properly follow the required rows or tracks without a tendency of the steering system to cause crabbing of the vehicle out of the required line of travel.

Actuation of the steering system is provided by an hydraulic cylinder 55 coupled between a flange 55A mounted on the beam 24 and a suitable lug on the rear face of the axle assembly 10. Suitable hydraulic controls (not shown) are available to achieve the necessary accuracy of steering action.

The frame including the front channel 10A, the plates 120 and 122, the rear beam 24 and the rear channel 11A thus forms a substantially rigid structure which can pivot solely about the vertical steering pivot pin 123. There is no flexibility in the frame which allows any twisting of the frame either by twisting of the beams or by specifically provided universal couplings in the steering system. The movement of the wheels relative to the frame is accommodated solely by the suspension of the axle members. The front air springs are totally independent while a connection is made across the rear air springs to accommodate roll. This provides a vehicle which is highly stable with a very effective suspension action which can accommodate movement over agricultural terrain. At the same time the boom and the load described hereinafter are mounted on the stable rigid frame and thus are not exposed to twisting actions of the frame.

The articulated steering system using the pivot point close to but just rearward of the front axle allows the steering action to take place without the wheels being brought closer into the frame. It will be appreciated from viewing the geometry of FIG. 4 that if the front part of the vehicle moves to the right to provide a steering action, the right hand wheel on the front axle will move away from the frame rather than closer to the frame defined by the rear part of the vehicle.

The positioning of the steering allocation was entirely separate from the support of the wheels allows the previously described on-the-go adjustment of the tracking of the vehicle since other techniques for adjustment of the tracking of the vehicle require extensive adjustment of the steering couplings which are of course altered as the track of the vehicle is altered. In this case the track of the vehicle is altered simply by sliding in and out the portion 43 relative to the sleeve 42 and this is in no way related to the steering arrangement.

The forward portion of the frame in front of the front axle 10 is defined by the forward portion of the upper plate 120 together with a pair of vertical plates 124 and 125 which are welded to the front face of the channel 10A and the under surface of the plate 120 and project in parallel spaced relationship forwardly therefrom at a spacing substantially equal to the width of the engine compartment. On the inner surface of each of the plates 124, 125 is welded a horizontal flange 126, 127 which is positioned at approximately half the height of the respective plate and extends from the front of the plate to a position approximating the front of the plate 120. The flanges 126, 127 extend only partly across the engine compartment and provide mounting flanges for the motor 13, the radiator 60, and the hydraulic pump system 14 previously described.

The cab 15 is effectively mounted upon the upper surface of the plate 120. The engine cover 20 extends downwardly from the front of the cab to a position just above the hydraulic pump system 14.

Mounts for the engine and for the hydraulic pump 14 are not shown as these will be apparent to one skilled in the art. The engine is a suitable internal combustion engine the power and type of which can be selected by one skilled in the art. The engine does however a main drive coupling 57 at one end and accessory drive shaft 58 at the other end for driving a fan 59. It will be noted that the engine is mounted on the frame so that the main drive coupling 57 projects forwardly toward the forward end of the frame. The fan 59 is therefore between the engine and the cab 55 and rearwardly of the fan is mounted a suitable cooling radiator indicated at 60. The main drive coupling is connected directly to the hydraulic pump 14 the details of which are again not shown as these will be apparent to one skilled in the art. The pump 14 is thus readily accessible at the front end of the vehicle as shown in FIG. 1 so that the simple removal of a cover provides direct access to the hydraulic connections and to the servicing of the hydraulic pump which constitutes the most difficult and arduous part of the servicing of the vehicle. The engine and pump are therefore readily available for full servicing both in view of the positioning of the engine in the reversed orientation as shown. This orientation also allows the engine cover 20 to depend downwardly from the front of the cab to a low front edge for attractive appearance and for improved visibility.

The hydraulic supply system is indicated schematically at 61 including the control unit 62. The details of the control arrangements by which the hydraulic drive to the ground wheels is provided will be apparent to one skilled in the art.

Figure 2:
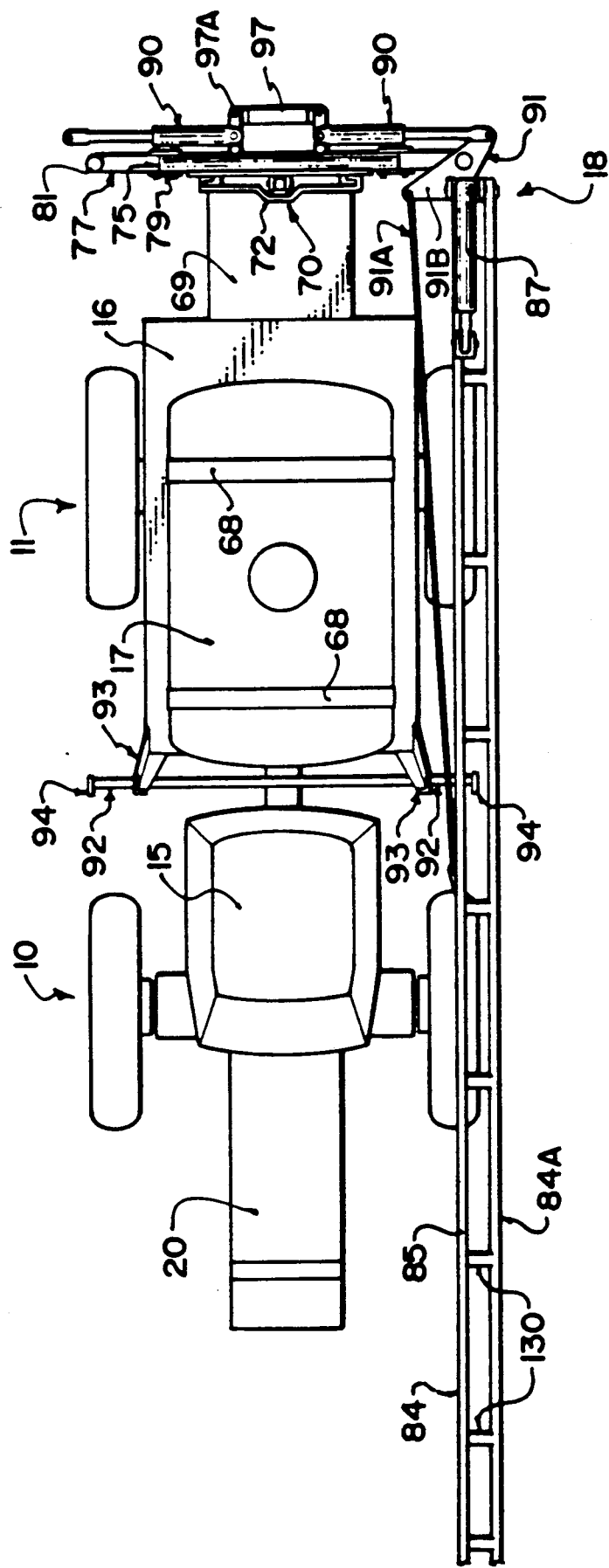
FIG. 2 is a top plan view of FIG. 1.
Figure 3:
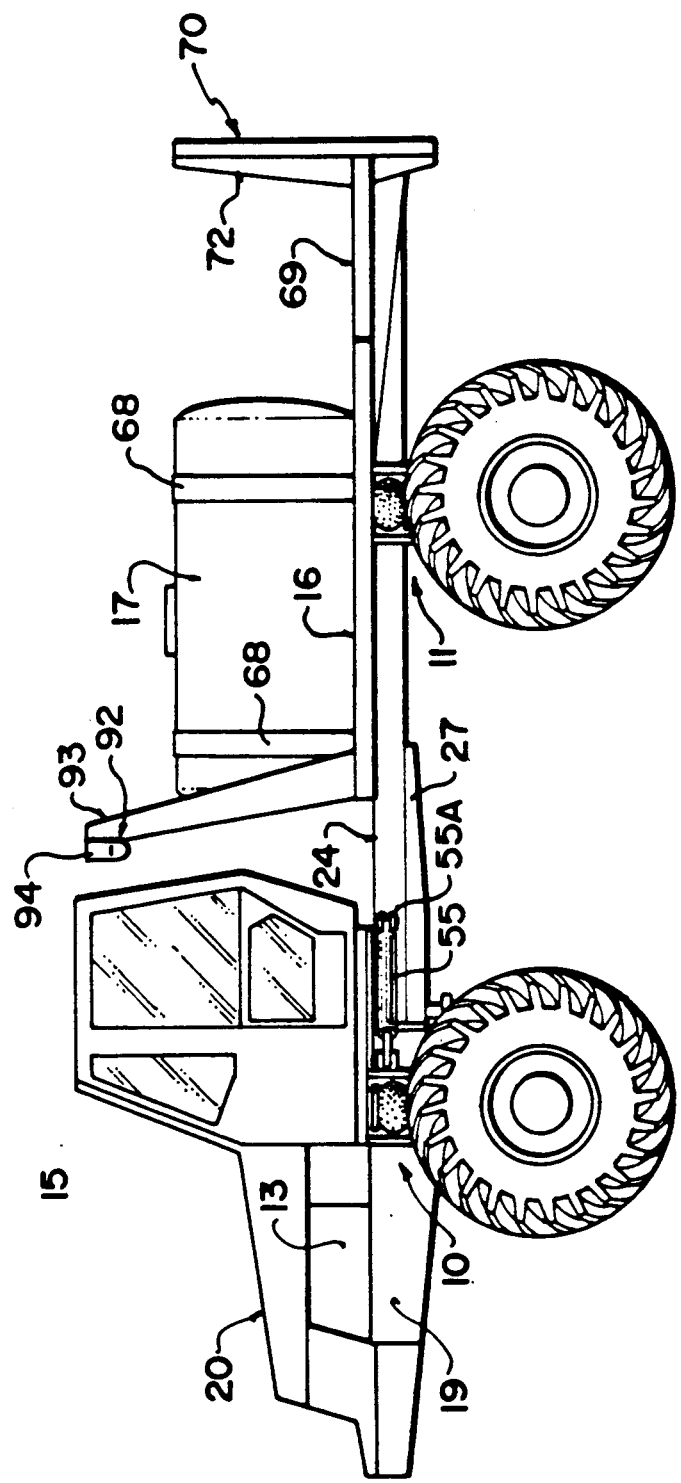
FIG. 3 is a side elevational view of the sprayer of FIG. 1.
Figure 7:
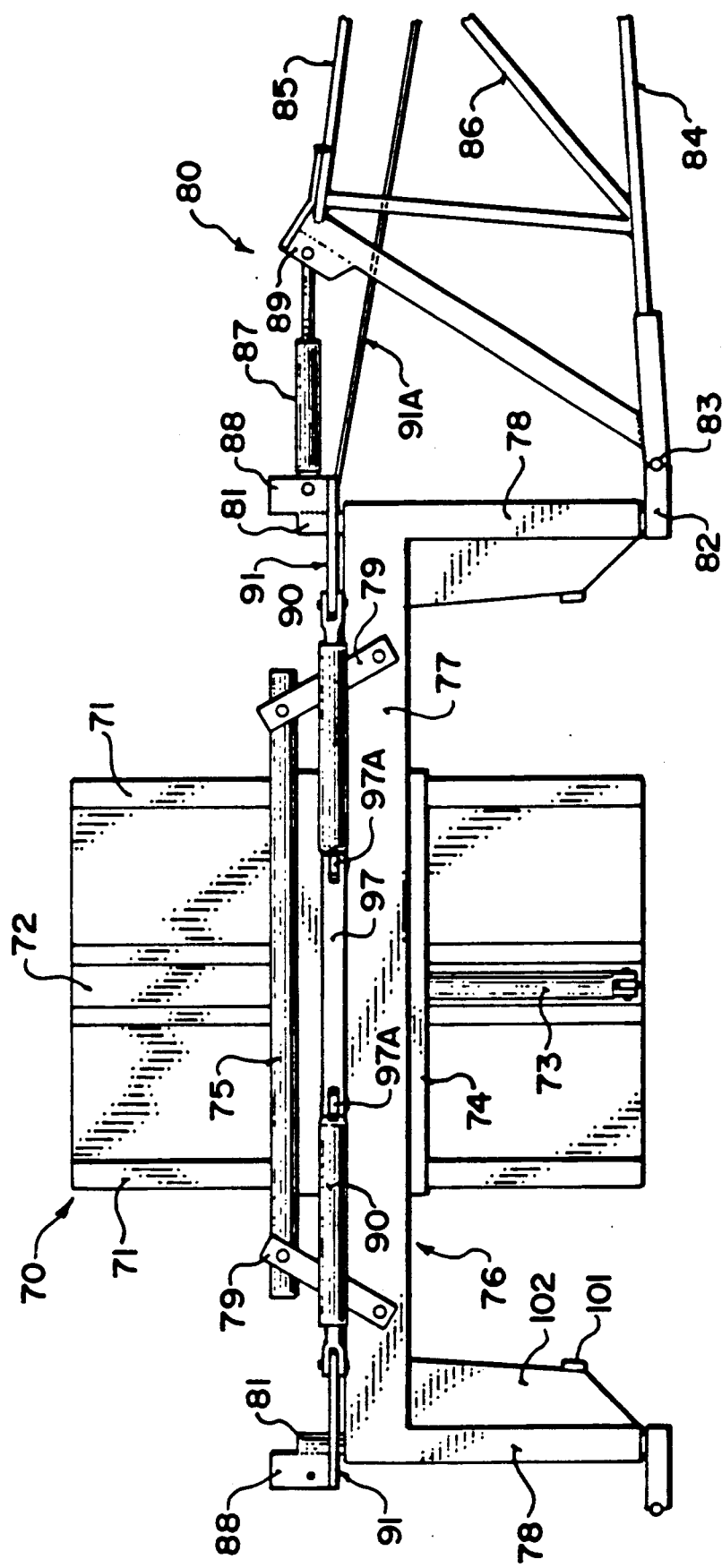
FIG. 7 is a rear elevational view of a centre portion of the boom and boom control assembly.

The above description of the vehicle including the frame, suspension, drive and power system can relate to various different types of vehicle. In this particular case the device is used as a sprayer and the details of the spraying system will be described as follows:

Referring therefore to FIGS. 2, 5 and 7, the spraying system comprises the tank 17 and the boom 18. The tank 17 (FIG. 5) is mounted upon the platform 16 which includes a base frame defined by longitudinal frame members 63 and transverse frame members 64. A sheet metal support 65 is provided for the tank 17 which defines a partial cover for the platform together with upstanding curved sides 66 which confine a lower portion of the tank and define a flange 67 for straps 68.

The boom is supported upon a boom support structure comprising a frame portion 69 which extends rearwardly from the platform 16 and terminates in a vertical support plate 70. The platform 16 and the support structure 69 are suitably clamped to the main beam 24 defining the rear portion of the frame.

The vertical support plate 70 includes a pair of flanges 71 along the vertical side edges thereof and a central recess portion 72 which receives a vertical hydraulic ram 73. The ram operates upon a moveable plate 74 which runs on rollers carried upon and guided by the plate and particularly the flanges 71. Thus the plate 74 can move up and down to variable heights from a lowered position adjacent the bottom of the plate 70 to a raised position at the top of the plate 70. In order to achieve this amount of adjustment, the ram may communicate with the plate 74 by way of a pulley and chain system which achieves the required movement without the necessity of movement of the ram by that distance. The movable plate 74 includes a pair of vertical flanges which are parallel and extend at respective sides rearwardly of the plate. The flanges have a pair of aligned holes through which projects a horizontal tubular support 75 which extends transversely across the top of the plate 74. The mounting of the support 75 on the flanges allows slight pivotal movement about a horizontal axis transverse to the vehicle. Thus the tubular member support 75 can be raised and lowered and provides a support for the whole structure of the boom and allows a slight pivotal movement to the boom in a forward and rearward direction about the axis of the tubular member.

The boom includes a boom support frame 76 which is a cross beam 77 and a pair of vertical end supports 78. The cross beam 77 is connected to the tubular member 75 by a pair of suspension links 79 which are pivoted at the upper end to the tubular member 75 and at the lower end to the cross beam 77 thus allowing the beam to move side to side and to tilt relative to the tubular member 75 as the vehicle tilts.

The vertical end supports 78 each comprise a support sleeve for a main post passing through a respective one of the sleeves and providing a support for the boom structure indicated at 80. The main post carries at its upper end a collar 81 which rests upon a top of the cross beam 77 and can be rotated around the axis of the post. At a lower end of the post there is mounted a plate 82 which extends from the post outwardly to a horizontal pivot coupling 83. The main boom is formed by a truss structure including two parallel horizontal lower struts 84, 84A, an inclined upper strut 85 and a plurality of interconnecting tie bars 86, 86A. The inner ends of the horizontal main support struts 84, 84A is connected to the pivot coupling 83 to allow the boom structure to be raised and lowered about the horizontal pivot 83. Actuation of this movement is achieved by a hydraulic cylinder 87 coupled between a clevis 88 on the collar 81 and a clevis 89 connected to the inner end of the inclined strut 85.

Each boom portion 80 can be pivoted about the vertical tubular member 78 by the action of a hydraulic cylinder 90 upon a lever 91 coupled to the main support post. This movement causes each of the boom portions 80 to pivot around the main support post to a position alongside the vehicle as shown in FIG. 2. With the boom in the raised position, this folding action causes the boom to engage over a support bar 92 carried on a post 93. The bar 92 extends across the full width of the vehicle and extends outwardly from each side and is terminated by a vertical flange 94 which holds the boom in position.

It will be noted that the boom tie parts include a pair of vertical struts 95 and 96 which are spaced by a short distance sufficient to loop over the support 92 so that the upper inclined rail 85 loops over the support bar and rests in place on the support bar. Thus in a folding action, the boom would be raised, folded into position and then lowered slightly to latch the boom into place. The cylinders 90 are not directly connected to the cross beam 77 at their inner end but are instead connected to a linkage 97. The coupling between the linkage 97 and the respective one of the cylinders 90 is provided by a lever 97A (FIG. 2) pivoted on a rear face of the cross beam 77. This allows a forward to rearward floating action of the boom arms so that these are self aligning with a reduced tendency to move forwardly and rearwardly independently carried by movement of the vehicle. A cable 91A connects between a forward projection 91B of the lever 91 to reduce torque on the connection between the boom and the support.

The supply hose for the liquid is indicated at 100 and includes a plurality of nozzles 100A of a conventional nature.

The boom can thus be lowered to a position in which the nozzles are arranged at a height less than 24 inches and preferably of the order of 20 inches from the ground for spray patterns to be used directly on the ground or on a crop just after emergence. In addition the boom can be raised to a position in which the nozzle height is of the order of 60–100 inches from the ground for use in crops which are well grown.

A linkage 101 extends from a coupling on the side of the platform to a stiffening plate 102 connecting the horizontal beam 77 to the vertical support tube 78. The linkage 101 thus controls pivotal movement of the boom about the horizontal tubular member 75. As the linkage is connected to the platform, the lower end of the boom moves around a radius defined by the linkage so that the lower end of the boom moves forwardly and rearwardly depending upon the height of the boom. In a lower most position of the boom for spraying on the ground or on just emerged crop, the boom is moved forwardly so that the nozzles project at a forwardly inclined direction. As the boom is raised, the boom tends to move rearwardly so that the forward angle of the nozzles is reduced or eliminated.

The sprayer thus formed by the above described elements has the following advantages.

1. It is self propelled.
2. It can be manufactured cheaply and simply in view of the economic design.
3. It can be used for many different spraying operations and in various crop conditions in view of the wide adjustment of the boom height.
4. It uses narrow agricultural type tires which do not significantly interfere with the crop.

5. The track can be adjusted to accommodate row crop widths or to follow the tram line system.

6. The steering system allows the device to follow a required row.

7. The clearance of the unit is very high so that the vehicle can be used with crops at all stages during growth.

Figure 8:
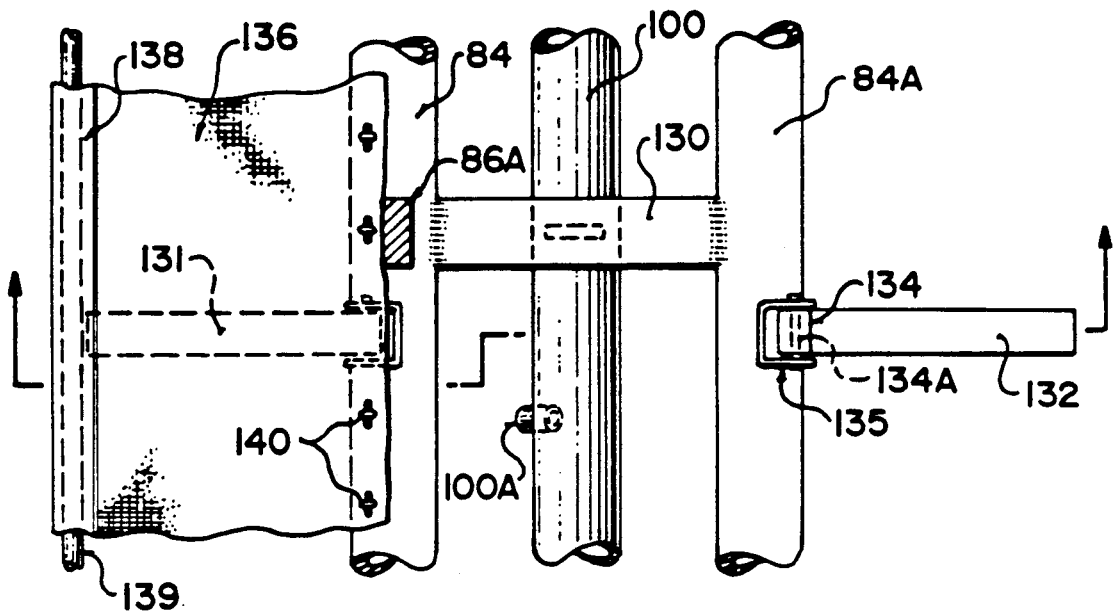
FIG. 8 is a top plan view of a portion of the boom showing a spray shield arrangement omitted from FIG. 1 for convenience of illustration.
Figure 9:
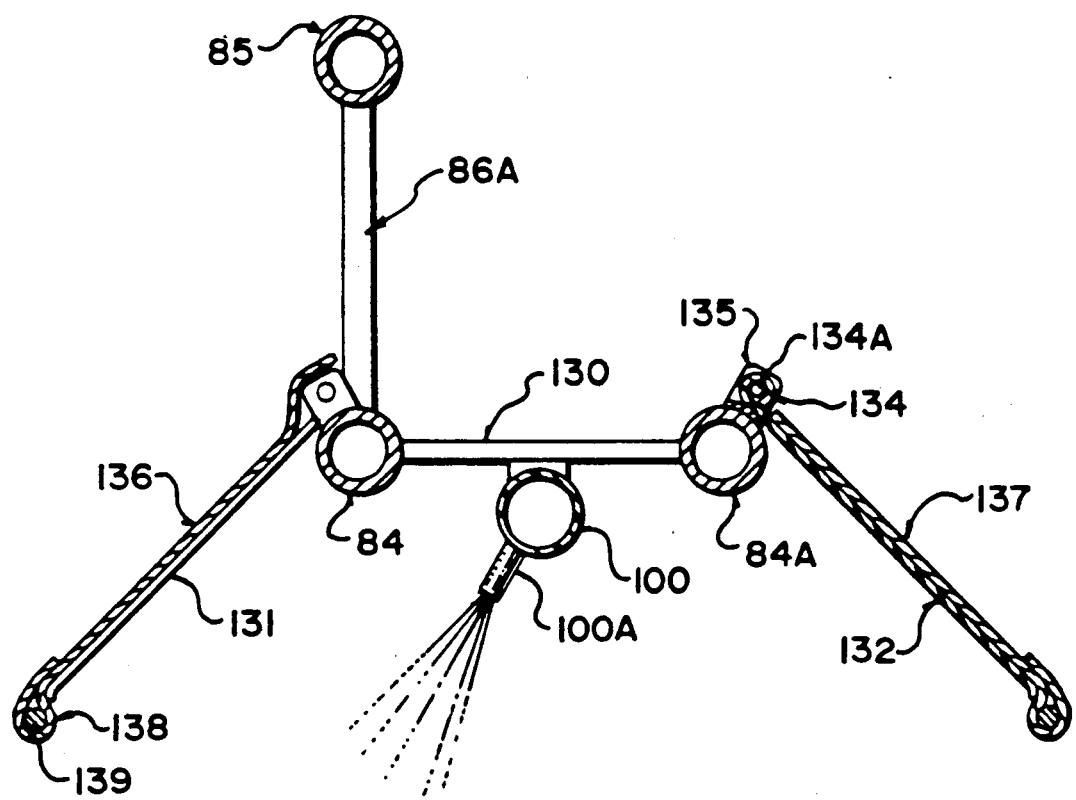
FIG. 9 is a cross sectional view along the lines 9—9 of FIG. 8 through one portion of the boom showing the spray shield arrangement.

Turning now to FIGS. 8 and 9, there is shown a shielding arrangement for the boom which is provided to improve the ability of the sprayer to spray in windy conditions and to reduce drift. The provision of shields or covers is well known and various different designs available. The boom as previously described includes the inclined beam 85 and the two lower beams 84 and 84A which are arranged parallel. The lower beams 84 and 84A are connected by occasional straps 130 which also act to support the liquid supply tube 100 which is mounted directly between the lower beams 84 and 84A and just beneath the straps 130.

Each of the beams 84 and 84A carries a plurality of spring metal arms 131, 132. Each of the spring metal arms is formed of a flat strip of a suitable spring metal with the upper end of the flat strip being attached to a sleeve 134 for pivotal movement therewith. The sleeve 134 is carried on a clevis 135 defined by a pair of upstanding flanges and a cross pin 134A, extending through the sleeve. This allows the spring arms to pivot about an axis longitudinal of the respective beam. The lowered position is shown in FIG. 9 in which an underside of the arm rests against the respective beam. It will be appreciated also that the arms can be rotated in a clockwise or anti-clockwise direction as required to a raised position. In such a raised position the arms 131 extend substantially vertically upwardly and the arms 132 can be rotated to the approximately 10 o'clock position inclined toward the inclined beam 85.

Each of the beams includes a plurality of the spring arms along the length spaced by a suitable distance to provide support for a fabric cover indicated at 136, 137. Each of the fabric covers comprises simply an elongate strip of fabric having a length either as an integral piece or as a number of separate pieces equal to the length of one of the boom arms and a width of the order of 12 to 18 inches. The fabric strip is folded at its lower end and stitched to form a sleeve 138 within which is received an elongate weighting rod 139 which is slightly flexible but of sufficient stiffness to hold the front edge of the fabric strip in a substantially straight condition between the spring arms 131, 132. The upper edge of the fabric is attached to the respective beam 84, 84A by a plurality of fasteners 140. The fasteners may be of the type in which a latch mounted on the beam extends through a slot shaped opening in the fabric edge and then can be rotated through 90° to hold the fabric edge in place on the beam. The shield is therefore manufactured very simply and expensively from the elongate fabric strip and the plurality of simple spring arms. The shield can be raised when not required to a storage position above the beams 84, 84A or can simply be removed by releasing the fasteners 140.

The area between the beams 84, 84A is left merely open so that air flow can pass between the beams to accommodate induced air currents generated by the liquid sprayed by the nozzles. The geometry of the front and rear shields together with the central open area also provides an effective passage of the air over the shielded sprayer without generating significant turbulence.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural vehicle comprising a frame, a pair of ground wheels each having a hub on which the wheel rotates and a tire with a ground engaging periphery for supporting the frame in movement across the ground in a direction along an axis longitudinal of the frame, the wheels being spaced to respective sides of a center line of the vehicle, parallel to said longitudinal axis and a pair of suspension devices each for connecting a respective one of the ground wheels for flexible movement relative to the frame in a vertical direction to accommodate variations in ground height, each suspension device comprising a rigid axle member, means mounting the axle member on the frame for pivotal movement about a suspension axis fixed relative to the frame and extending substantially parallel to said longitudinal axis and located inwardly of the ground wheel, the axle member comprising a first portion extending in a substantially horizontal direction from said suspension axis to another end at a position closely adjacent said ground wheel, and a second portion rigidly coupled to the first portion and extending substantially vertically downwardly from the outer end to a lower end at the hub so that the hub is located downwardly and outwardly of the suspension axis, means mounting the hub on the lower end such that all force communicated to the hub from the ground passes into the second portion and from the second portion into the first portion, the hub providing rotation about a wheel axis at right angles to the longitudinal axis and fixed relative to said axle member such that vertical movement of said ground wheel about said suspension axis causes horizontal movement of said tire periphery at the ground in a direction at right angles to said suspension axis, and spring means connected between said frame and said axle member providing a spring resistance to upward movement of said axle member relative to the frame about said suspension axis.

2. The invention according to claim 1 wherein said spring means comprises gas spring means which includes one end which is expandable and compressible relative to another end thereof with said one end connected to said frame and to said other end connected to the axle member.

3. The invention according to claim 2 wherein said spring means consists of a single gas spring member.

4. The invention according to claim 1 wherein the horizontal portion includes means for adjusting the length thereof for adjusting the spacing between the ground wheels.

5. The invention according to claim 4 wherein each of the axle members comprises a receiving portion and an extension portion slidably mounted within the receiving portion such that an outer end of the extension portion can be moved to increase and decrease spacing thereof from a centre axis of the frame.

6. The invention according to claim 5 wherein the frame includes a channel member extending at right angles to said longitudinal axis and defining a horizontal upper web and a pair of depending sides, said axle member being mounted within the channel member for pivotal movement about a support pin bridging said side portions of said channel member, said spring means being connected between an under surface of said web and an upper surface of said axle member.

7. The invention according to claim 1 wherein the frame has a centre axis longitudinally thereof positioned midway between said ground wheels and wherein the suspension axis are arranged closely adjacent the centre axis.

8. The invention according to claim 1 wherein shock damping means for damping movement of the suspension device consists solely of said ground wheel and said axle member and the cooperating movement of the tire periphery on the ground.

9. The invention according to claim 1 wherein the axle member extends substantially at right angles to the longitudinal axis.

10. The invention according to claim 1 including a second pair of ground wheels, each of said second pair of ground wheels having a suspension device, said frame defining a front portion having one of said first and second pairs of ground wheels mounted thereon and a rear portion having the other of said first and second pairs of ground wheels mounted thereon, and pivot connection means connecting the front portion to the rear portion for pivotal movement about a vertical axis to provide an articulated steering system for said frame.

11. The invention according to claim 10 wherein the pivot connection means is arranged closer to the pair of ground wheels on the front portion than the pair of ground wheels on the rear portion and sufficiently close thereto to cause the steering action to take place substantially solely at the front pair of wheels.

12. The invention according to claim 11 wherein the rear pair of ground wheels is mounted on the frame for adjustable movement in a direction longitudinal of the frame.

13. The invention according to claim 10 wherein the frame includes a single beam extending along a central axis of the frame and wherein pivotal movement of the front portion of the frame relative to the rear portion of the frame takes place solely above said vertical steering axis.

14. An agricultural vehicle comprising a frame having a front frame portion and a rear frame portion, a front pair of ground wheels mounted on the front frame portion and a rear pair of ground wheels mounted on the rear frame portion, suspension means mounting the ground wheels on the frame for supporting the frame in movement across the ground in a direction along an axis longitudinal of the frame, an engine mounted on the frame providing motive power for driving at least one pair of the ground wheels, a load receiving section provided on the rear portion of the frame, and steering means comprising pivot connection means between the front frame portion and the rear frame portion and defining a vertical pivot axis, the pivot axis being arranged closer to the front pair of wheels than the rear pair of wheels.

15. The invention according to claim 14 wherein the pivot axis is arranged substantially immediately rearwardly of the front pair of wheels.

16. The invention according to claim 14 wherein the pivot axis is arranged to be spaced from the front pair of wheels by a distance such that in a steering action substantially only the front frame portion pivots about the vertical pivot axis.

17. The invention according to claim 14 wherein the pivot axis is arranged to be of the order of 18 inches rearwardly of a line joining the rotation axes of the front pair of wheels.

18. The invention according to claim 14 wherein the frame includes a single beam extending along a central axis of the frame and wherein pivotal movement of the front portion of the frame relative to the rear portion of the frame takes place solely about said vertical steering axis.

19. The invention according to claim 14 wherein the rear pair of ground wheels are mounted on the rear frame portion for adjustable movement in a direction longitudinal of the rear frame portion.

20. The invention according to claim 14 wherein each ground wheel is supported on the frame by an axle member comprising a receiving portion and an extension portion mounted within the receiving portion such that an outer end of the extension portion can be moved to increase and decrease spacing thereof from a centre axis of the frame.

21. The invention according to claim 20 wherein the frame includes a channel member extending at right angles to said longitudinal axis and defining a horizontal upper web and a pair of depending sides, said axle member being mounted within the channel member for pivotal movement about a support pin bridging said side portions of said suspension means comprising channel member, said spring means connected between an under surface of said web and an upper surface of said axle member.

22. A vehicle comprising a frame, a front pair of ground wheels mounted on the frame, a rear pair of ground wheels mounted on the frame, means mounting the ground wheels on the frame for supporting the frame in movement across the ground in a direction along an axis longitudinal of the frame, each of at least one pair of the ground wheels having a hydraulic motor mounted thereon for providing direct drive to the respective wheel, an engine having a main drive coupling at one end of the engine, a hydraulic pump driven by the main drive coupling of the engine for providing pressurized hydraulic fluid to the hydraulic motors, and means mounting the engine at one end of the frame with the main drive coupling and the hydraulic pump on that end of the engine which is adjacent said one end of the frame.

23. The invention according to claim 22 wherein the engine is mounted at the front end of the frame with the hydraulic pump forwardly of the engine.

24. The invention according to claim 23 wherein there is provided a cab rearwardly of the engine and a load section rearwardly of the cab.

25. The invention according to claim 22 wherein the frame includes a front portion having said one pair of ground wheels thereon and a rear portion having the other pair of ground wheels mounted thereon and pivot connection means connecting the front portion to the rear portion for pivotal movement about a vertical axis to provide an articulated steering system for said frame.

26. The invention according to claim 25 wherein the frame includes a single beam extending along a central axis of the frame and wherein pivotal movement of the front portion of the frame relative to the rear portion of the frame takes place solely about said vertical steering axis.

27. An agricultural vehicle comprising a frame having a front frame portion and a rear frame portion, a front pair of ground wheels mounted on the front frame portion and a rear pair of ground wheels mounted on the rear frame portion, spring suspension means mounting the ground wheels on the frame for supporting the frame in movement across the ground in a direction along an axis longitudinal of the frame, the spring suspension means allowing vertical movement of each ground wheel relative to the frame, an engine mounted on the frame providing motive power for driving at least one pair of the ground wheels, a load receiving section provided on the rear portion of the frame, and steering means comprising pivot connection means between the front frame portion and the rear frame portion and defining a vertical pivot axis, wherein the frame includes a single beam extending along a central axis of the frame and wherein pivotal movement of the front portion of the frame relative to the rear portion of the frame takes place solely about said vertical steering axis.

28. The invention according to claim 27 wherein the pivot axis is arranged to be spaced from the front pair of wheels by a distance such that in a steering action substantially only the front frame portion pivots about the vertical pivot axis.

29. The invention according to claim 27 wherein the pivot axis is arranged to be of the order of 18 inches rearwardly of a line joining the rotation axes of the front pair of wheels.

30. The invention according to claim 27 wherein each ground wheel is supported on the frame by an axle member comprising a receiving portion and an extension portion mounted within the receiving portion such that an outer end of the extension portion can be moved to increase and decrease spacing thereof from a centre axis of the frame.

31. The invention according to claim 27 wherein the frame includes a channel member extending at right angles to said longitudinal axis and defining a horizontal upper web and a pair of depending sides, said axle member being mounted within the channel member for pivotal movement about a support pin bridging said side portions of said suspension means comprising channel member, said spring means connected between an under surface of said web and an upper surface of said axle member.

* * * * *

Disclaimer 5,039,129—*Charles Balmer*, Manitoba, Canada. VEHICLE FOR AGRICULTURAL USE. Patent dated Aug. 13, 1991. Disclaimer filed Sept. 27, 1991, by the inventor.

Hereby enters this disclaimer to claims 23 and 24 of said patent.
*[Official Gazette December 17, 1991]*